United States Patent [19]

Berenbaum et al.

[11] 3,943,100

[45] Mar. 9, 1976

[54] NYLON FLAME RETARDANTS BASED ON CERTAIN ORGANIC ACIDS

[75] Inventors: Morris B. Berenbaum, Williamsville; Kenneth B. Gilleo, Depew; Francis E. Evans, Hamburg, all of N.Y.

[73] Assignee: Allied Chemical Corporation, New York, N.Y.

[22] Filed: Dec. 17, 1973

[21] Appl. No.: 425,486

[52] U.S. Cl. 260/45.85 T; 260/2.5 AJ; 260/45.8 NT; 260/45.8 NW; 260/45.8 R; 260/45.85 B; 260/45.85 S; 260/75 R; 260/78 SC; 260/77.5 A; 260/77.5 SS
[51] Int. Cl.² .................................. C08J 3/20
[58] Field of Search 260/45.8 NT, 45.8 NW, 45.8 R, 260/45.85 S, 45.85 N, 45.85 T, 45.85 B, 2.5 AJ, 2.5 BB, 75 R, 78 SC, 77.5 SS, 77.5 A

[56] References Cited
UNITED STATES PATENTS

| | | | |
|---|---|---|---|
| 3,087,900 | 4/1963 | Brown | 260/77.5 |
| 3,179,625 | 4/1965 | Ehrhart | 260/77.5 |
| 3,187,377 | 4/1965 | Raff | 260/2.5 |
| 3,293,196 | 12/1966 | Nakamori | 260/2.5 |
| 3,298,995 | 1/1967 | Bloor et al. | 260/45.85 |
| 3,487,122 | 12/1969 | Stengle | 260/45.85 |
| 3,497,457 | 2/1970 | Hurlock et al. | 260/45.85 |
| 3,531,423 | 9/1970 | Stokes et al. | 260/45.85 |
| 3,637,542 | 1/1972 | Doerge | 260/2.5 |
| 3,755,214 | 8/1973 | Sukman et al. | 260/45.85 |
| 3,798,198 | 3/1974 | Hole | 260/45.85 |

OTHER PUBLICATIONS

Chemical Abstracts, citation 14850h Vol. 61, (1964).
Chemical Abstracts, citation 1117i Vol. 57, (1962).

*Primary Examiner*—V. P. Hoke

[57] ABSTRACT

A flame resistant organic polymer which decomposes into fragments containing acidic and/or basic groups and the process for making same comprising treating an organic polymer which decomposes into said fragments with from about 0.5 to about 25 weight percent of a compound which contains at least one functional radical selected from —O—, —S— and —N— and at least one carboxyl or mercapto group which is able to dissociate in water to provide a free positively charged ion.

5 Claims, No Drawings

NYLON FLAME RETARDANTS BASED ON CERTAIN ORGANIC ACIDS

This invention relates to nylons and other polymers which upon heating decompose into fragments terminating in acidic or basic groups and preferably both acidic and basic groups, which polymers exhibit improved flame resistance. More specifically, this invention relates to nylon, polyester and polyurethane polymers treated with compositions which impart improved flame resistance thereto and to the process of so treating the polymers.

In the prior art numerous compounds have been used as additives to polymers which decompose into acid and base containing fragments, including nylon (polycarbonamides), polyurethanes and polyesters, to reduce flammability of the polymers. For example inorganic and organic tin, phosphorous and halogen containing compounds have been used to reduce flammability of nylon. These compounds have not, however, been entirely successful due to inefficiency or polymer degradation.

In addition to the tin, phosphorous and halogen containing compounds, some compounds, containing nitrogen and sulfur have been employed to improve flame resistance. For example thiourea and compounds containing non-cyclic imine groups have been used. Thiourea, while being an improvement over the other prior art compounds, still does not create as much flame resistance as is desired, or necessary, and the compounds containing imine groups do not give the desired flame resistance and, due to the imine group, hydrolize when contacted with water thus preventing the formation of a permanent application of the compounds to the nylon or other carbon containing polymers.

Other compounds containing both sulfur and nitrogen which have been suggested to impart flame resistance to nylon have been found to be inadequate since they contain too much carbon in relation to the amount of other elements present in the compound or the carbon is present in single flammable chain of excessive length, which chain will easily burn.

BRIEF DESCRIPTION OF THE INVENTION

In accordance with this invention it has been discovered that nylon and other organic polymers which decompose into fragments containing acidic and/or basic groups can be treated with certain additive compounds to give a flame resistance which is superior to the flame resistance obtainable by any known prior art compound or method.

The additive compounds, with which the organic polymer is treated, have the formula:

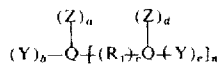

where Y is independently at each occurrence —$OR_3$, —$SR_3$ or —$N(R_3)_2$ where $R_3$ is H or lower alkyl of 1 to 3 carbon atoms; Q independently at each occurrence is a group containing from 1 to 10 carbon atoms selected from a phenyl group, an alkylene hydrocarbon chain of from 1 through 6 carbon atoms, a heterocyclic ring or combinations thereof, Z is independently at each occurrence a radical of from 0 through 3 carbon atoms containing a carboxylic or mercapto group which group is able to dissociate in water to provide a free ion having a positive charge, and which ion is ammonium or hydrogen or an ion containing a metal; $R_1$ is

where $R_2$ is hydrogen, lower alkyl of 1 to 3 carbon atoms, or

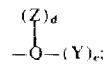

$a$, $b$, $d$ and $e$ are independently at each occurrence integers of from 0 through 3, $c$ and $n$ are integers of 0 or 1, provided that said compound contains at least one Z group and at least one group selected form Y, $R_1$ or a nitrogen, sulfur or oxygen containing heterocyclic ring, provided that when Q is a heterocyclic ring the compound does not contain both sulfur and nitrogen.

The novel composition in accordance with the invention comprises an organic polymer which decomposes into acidic and/or basic fragments containing from about 0.5 to about 25 weight percent of a compound or a mixture of compounds having the above formula since such compositions exhibit superior flame resistance. The polymer is preferably a nylon, polyester or polyurethane polymer.

DETAILED DESCRIPTION OF THE INVENTION

In accordance with this invention a polymer, such as nylon, polyester or polyurethane, which upon heating decomposes into fragments terminating in acidic or basic groups and preferably both acidic and basic groups, is treated with at least about 0.5 weight percent and preferably at least about 2 weight percent of a compound or a mixture of compounds falling within the above formula. Generally less than about 25 weight percent, preferably, less than about 16 weight percent, and most preferably less than about 8 weight percent of the compound or mixture of compounds is used since generally greater percentages do not materially increase flame resistance and can sometimes cause undesirable effects such as flaking on the surface of the polymer.

The polymer, e.g. nylon, may be treated by wetting the surface with a solution or emulsion containing one or more of the above compounds or one or more of the compounds may be added to the polymer melt prior to the formation of polymeric products, e.g. a nylon fiber. Compounds added to the polymer melt should be stable in the melt and should not deleteriously affect the polymer. Examples of such compounds suitable for addition to nylon are:

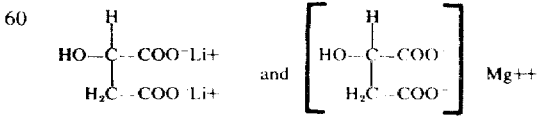

Q in the above general formula for the compounds may be a group containing from 1 to 10 carbon atoms selected from a phenyl group, an alkylene hydrocarbon chain of from 1 through 6 carbon atoms, any substituted or unsubstituted heterocyclic ring containing at least one sulfur or nitrogen atom in the ring or combinations thereof. Q for example may be in a heterocyclic ring in combination with a phenyl group or in combination with an alkyl group. The substituents, e.g. —OH or —COOH upon the ring should of course not contribute to flammability although hydrogen and small amounts of carbon can be tolerated. The heterocyclic ring, exclusive of substituents, preferably contains from four through six atoms and most preferably contains five or six atoms; and preferably contains either sulfur or nitrogen, but not both.

Examples of suitable heterocyclic rings, Q, which may be saturated or unsaturated, are: six membered rings containing nitrogen including azine, diazine, triazine, tetrazine and petazine rings; six membered rings containing sulfur including dithiin and thiopyran rings; five membered rings containing nitrogen including azole, diazole, triazole and tetrazole; five membered rings containing sulfur including thiole and dithiole rings; four membered rings containing nitrogen including azete, diazete and triazete rings and four membered rings containing sulfur including thietane rings.

Preferably when Q is a heterocyclic ring it is triazine, diazine, triazole or diazole, since the five and six membered rings are generally more stable than the four membered rings and since the rings containing more nitrogen in relation to the number of carbon atoms provide less fuel for combustion.

Preferred Q groups, when Q is an alkylene hydrocarbon chain, are —CH$_2$— and —CH$_2$CH$_2$—.

Y in the above general formula is independently at each occurrence —OR$_3$, —SR$_3$ or —N(R$_3$)$_2$ where R$_3$ is H or lower alkyl of 1 to 3 carbon atoms. Preferred Y groups are —OH, —SH, and —NH$_2$.

R$_1$ in the above formula is —S—, —O—, or

where R$_2$ is hydrogen, alkyl of 1 to 4 carbon atoms or

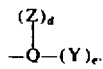

R$_2$ is preferably hydrogen.

Z in the above general formula is independently at each occurrence a radical of from 0 to 3 carbon atoms, containing a carboxyl or mercapto group which group is able to dissociate in water to provide a free ion having a positive charge, which ion is ammonium or hydrogen or an ion containing a metal. The ion may be a simple or complex ion and the metal is an element having only positive valences and no negative valences. The preferred metals as shown on the Modern Periodic Table are Group I, II, III, IV, V, VI, VII and VIII metals of the second, third, fourth and fifth periods. The most preferred metals are Li, Na, K, Mg, Ca, Cu, Zn, Al and Sn. Of the most preferred metals Li, Ca and Mg have been found best. Cu has been found to be very good when the compound is used to treat polyurethane. "Carboxylic group" as used herein means a carboxylic acid radical or its ammonium or metal salt and "mercapto group" as used herein means the ammonium or metal salt of —SH. The most preferred Z radicals are —COOH and its ammonium or group I metal or group II metal salts. The ammonium or group I or group II metal salts of —SH are also preferred. —SO$_2$H and —SO$_3$H and their salts are generally unacceptable as Z radicals in that they tend to degrade the polymer. As used herein being able to dissociate in water means that in water the Z radical while remaining attached to the compound will give up a positive ion. The Z radical is a radical of from 0 to 3 carbon atoms. As applied to the Z radical "from 0 to 3 carbon atoms" means the number of carbon atoms in the Z radical exclusive of carbon atoms contained in the portion of the Z radical which becomes a free positive atom.

While the reason for the improved flame resistance, obtained when polymers which decompose into fragments terminating in acidic or basic groups are treated with compounds as described herein, is not clearly understood, it is believed that the treated compounds react with the fragments of the polymer produced upon heating thus reducing further fragmentation and slowing vaporization. Slowing vaporization is believed to reduce flammability since it is believed that combustion takes place in a gas phase. An acidic group as used herein means a group which can accept a pair of electrons to form a coordinate bond and a basic group as used herein means a group which can donate a pair of electrons to form a coordinate bond.

Examples of compounds, and suggested methods of preparation, for use in increasing flame resistance of organic polymers, particularly nylon and polyesters are as follows:

Lithium ammonium tartrate 1 mol of tartaric acid is added to 600 grams of water and stirred while 1 mole of LiOH.H$_2$O is introduced. Ammonium hydroxide is then added to complete the neutralization to give a final pH of 7 to 8. Additional water is then introduced to provide a solids concentration of LiNH$_4$ tartrate of from 10 to 20 percent.

Dimercapto succinic acid

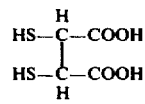

1 mole of malic acid is reacted with 2 moles of bromine to obtain 1 mole of dibromo succinic acid which is then reacted with 2 moles of sodium bisulfite to obtain 1 mole of dimercapto succinic acid.

Thiodisuccinic acid

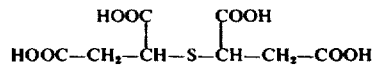

1 mole of maleic anhydride is dissolved in 1,000 ml of hot water and 1 mole of thiomalic acid is added. The resulting solution is heated on a steam bath for 2 hours and allowed to stand for 12 hours. Precipitation is then induced by scratching, concentration of the solution, and acidification. The resulting precipitate is thiodisuccinic acid.

Examples of other suitable compounds whose methods of preparation are well known in the art are:

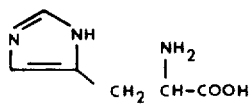 Histidine

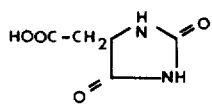 5-hydantoinacetic acid

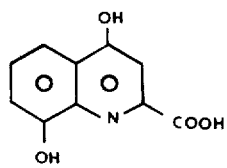 4,8-dihydroxyquinoline-2-carboxylic acid

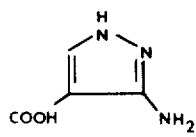 3-amino pyrazole-4-carboxylic acid

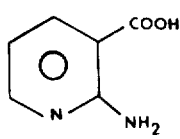 2-amino nicotinic acid

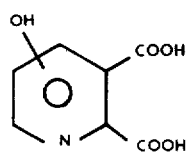 hydroxy quinolinic acid

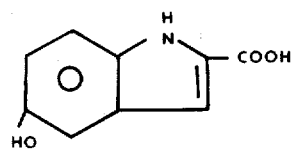 5-hydroxy-2-indole carboxylic acid

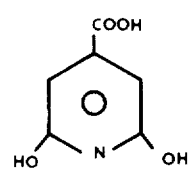 citrazinic acid

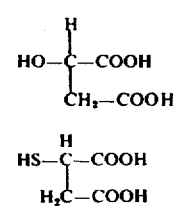

malic acid thiomalic acid

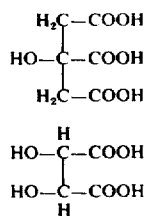 citric acid

 tartaric acid

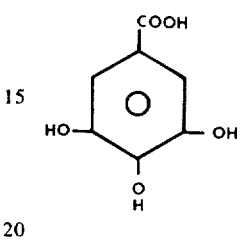 gallic acid

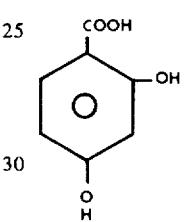 p-resorcylic acid

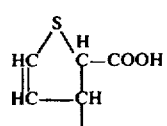 3-hydroxy 2-thiophene carboxylic acid

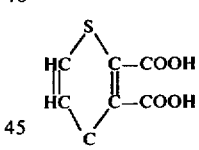 4-H-thiopyraz-2,3-dicarboxylic acid

The ammonium, or metal salts preferably the group I or group II metal salts of any of the above compounds are also suitable for improving the flame resistance of organic polymers which decompose into fragments terminating in acidic or basic groups. The lithium-ammonium salts of the above compounds are particularly effective.

In practicing this invention a compound as described herein, may be dissolved in solvent, usually water to make a solution of about 0.5 to about 50 weight percent, more preferably from about 1 to about 15 weight percent and most preferably from about 4 to about 8 weight percent. A fabric or carpet is then soaked by the solution which may contain other additives commonly used in finishing baths to improve properties such as penetration or water repellency. The fabric or carpet is then squeezed with any suitable apparatus such as pad rollers, to remove excess solution. The squeezing apparatus, such as the rollers, is adjusted to give from about 25 to about 300 weight percent, preferably from about 50 to 200 weight percent and most preferably from about 75 to about 150 weight percent wet pick up. The fabric or carpet material is then dried in air or in a dryer or oven at temperatures up to about 150°C. but preferably less than about 125°C.

The solution may be applied to the material in numerous ways. For example the material may be immersed in the solution or the solution may be sprayed upon the material or applied to the material by means of pad rolls.

The dry material can be tested for flame retardancy by several methods. In the case of apparel fabric, the Children's Sleepwear Standard is used. A 1½ inch flame from a bunsen burner is applied to the lower edge of a vertically supported fabric. Untreated (control) fabric may burn completely while fabrics composed of the compositions of this invention usually stop burning when the bunsen burner flame is removed indicating that in the absence of an externally applied elevated temperature which may be in the form of a flame, the material is usually self extinguishing.

Upholstery, tapestry and drapery fabrics are tested by holding the fabric over a 1½ inch bunsen burner flame for up to twelve seconds. Untreated fabrics may burn for several minutes, while fabrics made from the compositions of this invention usually extinguish in from 0 to 5 seconds after removal of the burner flame.

The additive compounds of this invention are generally more durable to laundering and dry cleaning than thiourea and are generally much more effective than prior art compounds. For example as little as 0.5 dry weight percent of those compounds described above particularly those containin 2 or 3 —OH or —COOH groups effectively reduces the flammability of nylon upholstery fabric while as much as 50 – 100 weight percent of prior art phosphorous or halogen containing compounds may be required to accomplish the same result. Nylon compositions containing from about 2 to about 16 dry weight percent of an additive compound of this invention usually pass most generally recognized flammability tests for synthetic fabrics. As much as about 25 dry weight percent can be used to obtain even better flame resistant properties.

The following examples serve to illustrate the process and composition of the invention. Unless otherwise indicated all parts and percentages are by weight.

EXAMPLE 1

A pad bath of the following composition is prepared: 9 g. of malic acid, 20 g. ethylene glycol (as wetting and swelling agent) and 170 g. water. A piece of 16 oz./yd. nylon-6 upholstery fabric 3 × 10 inches is dipped into the solution and squeezed through a wringer (laboratory padder) to obtain a wet pick up (weight increase) of 164% corresponding to a dry chemical add-on of about 4% malic acid. The sample is dried in a horizontal position in a circulating oven at 140°C. for 1 hour.

The sample is placed in a desicator containing $CaSO_4$ drying agent and allowed to cool for 15 min. The sample is tested by the New York Port Authority (NYPA) test whereby it is clamped in a vertical position and a 1½ inch bunsen flame is applied to the lower edge for 12 seconds. After removal of the flame, the fabric burns for 1.2 seconds and has a char length of 2¼ inches.

EXAMPLE 2 – 9

The procedure of Example 1 is followed for Examples 2 – 9 except different compositions and concentrations are used.

The results are set forth in Table I.

TABLE I

| EXAMPLE | TREATING AGENT | % ADD ON | AREA DESTROYED (in²) | AFTER FLAME (sec) | CHAR LENGTH (in) |
|---|---|---|---|---|---|
| 2 | None | — | 10 | 49 | 6.35 |
| 3 | Gallic Acid | 2.7 | 2.4 | 18.3 | 2.65 |
| 4 | " | 3.6 | 1.7 | 9.4 | 2.5 |
| 5 | " | 3.7 | 1.0 | 4.5 | 2.1 |
| 6 | " | 5.9 | .98 | 0.14 | 2.5 |
| 7 | ethylene diamine tetra acetic acid | 5.5 | 1.2 | 0.9 | 3.0 |
| 8 | thiomalic acid | 5.5 | 1.0 | 0.9 | 2.1 |
| 9 | citric acid | 6.2 | 1.8 | 9.6 | 2.5 |

EXAMPLES 10 – 21

The procedure of Example 1 is followed except the fabric is a 4 inch × 4 inch piece of nylon 6 carpet backed with jute and the flame test used is a modified United States Department of Commerce Test DOC FF1-70 wherein a 250 watt heat lamp is positioned five inches from the carpet surface and is controlled by a Variac. The lamp is turned on for 5 minutes at a pre-set voltage on the Variac in order to provide a more vigorous test. The higher the voltage applied to the heat lamp the greater the heat applied to the carpet prior to burning the carpet. The carpet is burned by placing a 150 mg. methinamine pill in the center of the carpet. The pill is then ignited. The higher the voltage which can be applied to the heat lamp before the carpet fails to extinguish within 60 seconds after the pill has finished burning, the better the flame resistant properties of the carpet.

The following Table II shows the highest voltage applied to the heat lamp before the carpet fails to extinguish within 60 seconds after the pill has finished burning, the additive used, the burn area resulting from the test and the percentages of additive on the carpet.

TABLE II

| EXAMPLE | ADDITIVE | % ADD ON | HIGHEST VOLTAGE BEFORE FAILURE | BURN AREA (sq.in.) |
|---|---|---|---|---|
| 10 | Thiomalic acid | 12.5 | 120 | 1.2 |
| 11 | Ethylene diamine tetra acetic acid | 10.0 | 60 | 1.1 |
| 12 | Gallic acid | 9.6 | 90 | 1.0 |

TABLE II-continued

| EXAMPLE | ADDITIVE | % ADD ON | HIGHEST VOLTAGE BEFORE FAILURE | BURN AREA (sq.in.) |
|---|---|---|---|---|
| 13 | Ammonium ethylene diamine tetra acetate | 10 | 60 | 1.0 |
| 14 | Lithium ethylene diamine tetra acetate | 8 | 60 | 1.0 |
| 15 | Calcium ethylene diamine tetra acetate | 9.2 | 60 | 1.0 |
| 16 | LiNH₄ citrate | 9.8 | 210 | 1.2 |
| 17 | LiNH₄ tartrate | 8.7 | 120 | 1.0 |
| 18 | Tartaric acid | 11.5 | 120 | 1.0 |
| 19 | LiNH₄ malate | 12.0 | 210 | 1.5 |
| 20 | Malic acid | 10.5 | 90 | 1.5 |
| 21 | None | — | 0 | complete burn |

EXAMPLE 22

The procedure of Example 1 is followed except flexible polyurethane foam is treated with an aqueous solution of thiomalic acid to obtain a 5 weight percent dry add-on. The foam is then tested in accordance with the procedure of ASTM-1692. The treated sample is initially difficult to ignite and a 4 inch burn distance is obtained; whereas, a 5 to 6 inch burn distance is obtained on an untreated sample indicating that under the test conditions the treated sample has better flame resistance than the untreated sample.

EXAMPLE 23

The procedure of Example 10 is followed except a polyester carpet is treated with 16.8 weight percent dry add-on of LiNH$_4$-tartrate. The highest voltage applied to the heat lamp before the carpet burns in excess of 60 seconds after the pill finishes burning is 130 volts; whereas, an untreated polyester carpet burns in excess of 60 seconds when only 60 volts is applied to the heat lamp.

What is claimed is:

1. A solid composition comprising a nylon polymer and from about 0.5 to about 25 weight percent of a flame retardant additive which is thiomalic acid, dimercaptosuccinic acid, gallic acid, citric acid or tartaric acid, or the ammonium, lithium or magnesium salts thereof.

2. The composition of claim 1 wherein the additive is the lithium salt of gallic acid.

3. The composition of claim 1 wherein the polymer contains between 2 and 16 weight percent of the additive.

4. A process for increasing the flame resistance of a nylon polymer which comprises adding to the polymer from about 0.5 to 25 weight percent of a compound which is thiomalic acid, dimercaptosuccinic acid, gallic acid, citric acid or tartaric acid, or the ammonium, lithium or magnesium salts thereof.

5. The process of claim 4 wherein the compound is added to the nylon by wetting the nylon with an aqueous solution comprising 1 to 15 weight percent of the compound.

* * * * *